Figure 1:
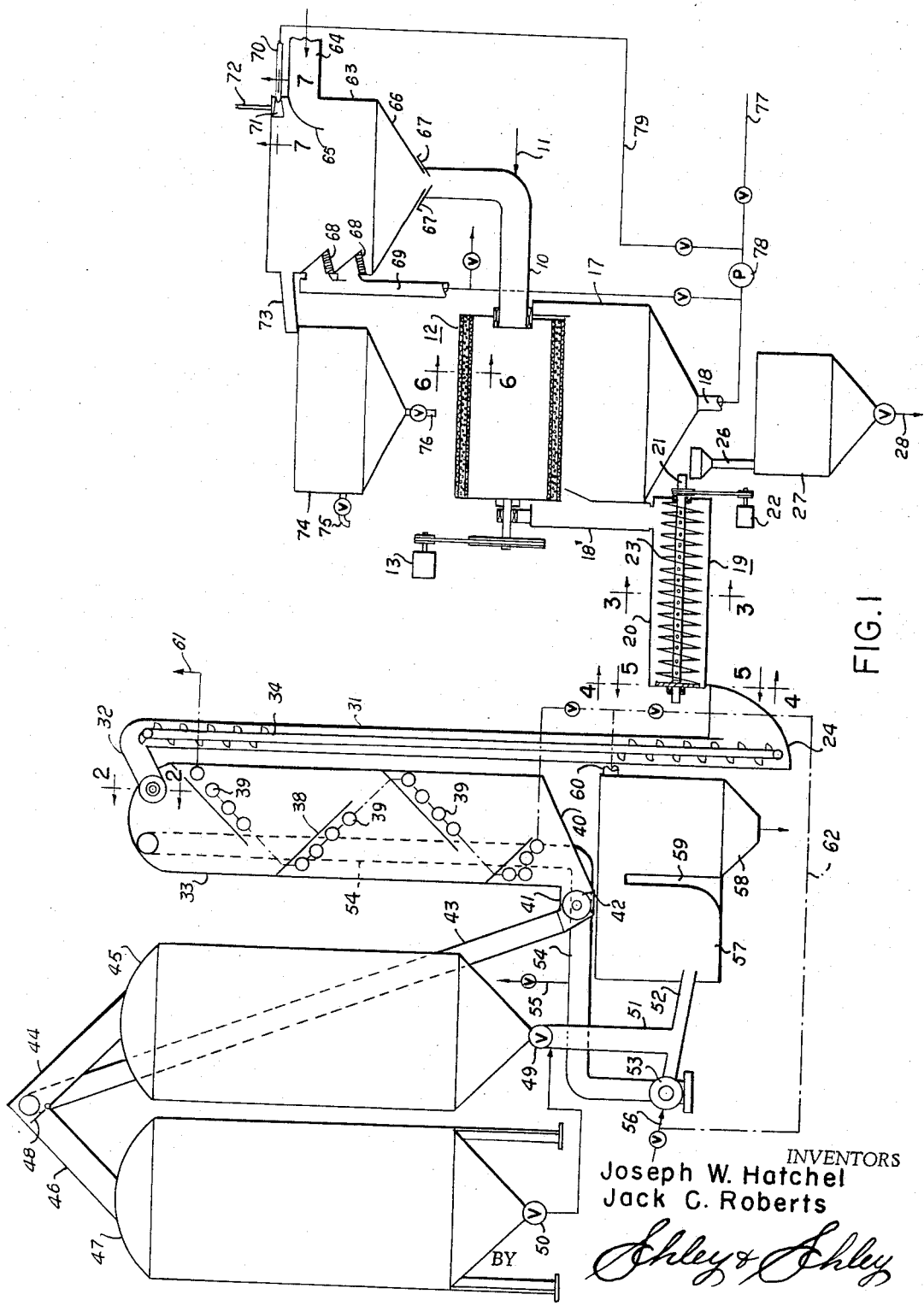

INVENTORS
Joseph W. Hatchel
Jack C. Roberts

BY Ehley & Ehley

ATTORNEYS

July 4, 1967   J. W. HATCHEL ETAL   3,329,107
SEWAGE DISPOSAL PLANTS AND METHODS OF SEWAGE DISPOSAL
Filed Nov. 22, 1965
2 Sheets-Sheet 2

INVENTORS
Joseph W. Hatchel
Jack C. Roberts
BY Ehley & Ehley
ATTORNEYS

United States Patent Office 3,329,107
Patented July 4, 1967

3,329,107
SEWAGE DISPOSAL PLANTS AND METHODS OF SEWAGE DISPOSAL
Joseph W. Hatchel, Garland, and Jack C. Roberts, Arlington, Tex., assignors to Pollution Eliminators, Inc., Grand Prairie, Tex., a corporation of Texas
Filed Nov. 22, 1965, Ser. No. 509,116
12 Claims. (Cl. 110—15)

This invention relates to sewage disposal plants and methods of sewage disposal.

There has long been a need for a compact, comparatively inexpensive sewage disposal plant and methods of sewage disposal for use by small municipalities and certain types of industrial plants as well as for use as overload facilities for larger municipalities. Presently existing sewage disposal processes and plants are relatively expensive and quite large, requiring considerable areas of ground or space, or if the anaerobic bacteria type process is utilized, very large areas of ground are necessary, and such installations have a relatively short useful life.

There are certain industries, such as meat packing plants, in which quantities of waste products occur which must be processed not only for disposal, but also to recover certain useful by-products. These waste products are known as paunch manure. This invention is thus directed primarily to paunch manure and humus disposal processes and plants of a compact and relatively inexpensive nature.

It is a principal object of the invention to provide improved sewage disposal plants and processes in which moisture is removed from the sewage in successive steps followed by the pressing, compacting and comminuting of the sewage to a final drying step after which the sewage is combusted and the heat of combustion efficiently and effectively employed in the drying process.

An additional object of the invention is to provide improved processes and plants of the character described in which all by-products of the plants or processes are made available for further processing if such should be desirable and for the recovery of any useful components of such by-products, together with the utilization of evolved vapors and gases which may be useful as supplementary fuels.

A still additional object of the invention is to provide new and useful improvements in sewage disposal plants which include a unique and novel structure for expressing water from raw sewage while compacting the solids thereof and dividing the compacted solids into discrete solid particles.

Other and more particular objects of the invention will be apparent from a reading of the following description.

A construction designed to carry out the invention will be hereinafter described, together with other features of the invention.

Figure 2:
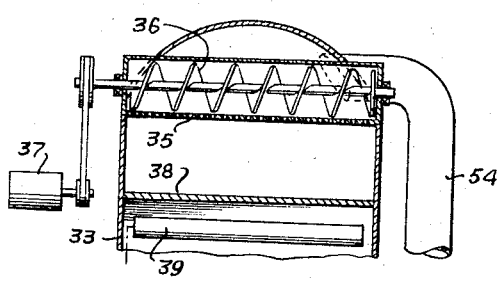
Figure 7:
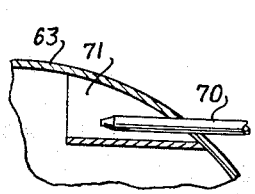

The invention will be more readily understood from a reading of the following specification and by reference to the accompanying drawings, wherein an example of the invention is shown, and wherein:

FIG. 1 is a schematic view of a sewage disposal plant constructed in accordance with this invention and adapted to carry out the processes thereof, FIG. 2 is an enlarged, vertical, cross-sectional view taken upon the line 2—2 of FIG. 1, FIGS. 3, 4, 5 and 6 are enlarged, vertical, cross-sectional views taken upon the respective lines of FIG. 1, and FIG. 7 is a horizontal, cross-sectional view taken upon the line 7—7 of FIG. 1.

In the drawings, the numeral 10 indicates an inlet conductor through which raw sewage may be admitted as indicated at 11, it being noted that in certain utilizations of the invention, there may be employed additional equipment in advance of the inlet conductor 10 as will be described more fully hereinafter.

Figure 6:
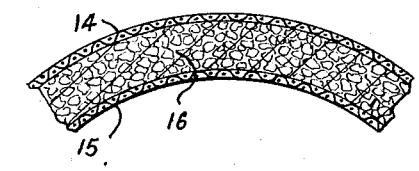

The inlet conductor 10 opens through one end of a water screen assembly 12 into the interior thereof, the assembly 12 being mounted for rotation around a horizontal axis by a driving motor or other rotating means 13. As shown in FIG. 6, the water screen assembly is formed of a pair of concentric cylindrical screens 14 and 15, the screens being spaced apart from one another and confining in the annulus between the screens a body of relatively loosely packed filtering material 16 which may be any suitable type of inorganic filter media. The loose packing of the filter material allows some movement of the particles thereof so that the filter is substantially self-cleansing.

The filter screen assembly operates through gravity, excess water being filtered from the raw sewage through the lower half of the filter and being received in a storage tank 17 underlying the screen assembly and having a discharge conductor 18 leading from its lower end through which separated water and liquids may be removed for subsequent use or disposal, as will be described hereinafter.

The end of the water screen assembly opposite the inlet end thereof is open and overlies a discharge chute 18' into which partially dewatered raw sewage passes from the screen assembly downwardly to a dewatering press 19. The press 19 includes an elongate, horizontal, cylindrical housing 20 having mounted therein for revolving about the horizontal axis of the housing, a tubular perforated shaft 21 driven by a motor or other motive means 22. A screw conveyor 23 is carried upon the shaft 21, having its periphery extending nearly to the inner wall of the housing 20, the convolutions of which may be progressively more closely spaced from the inlet end of the press 19 to the outlet end thereof.

Figure 3:
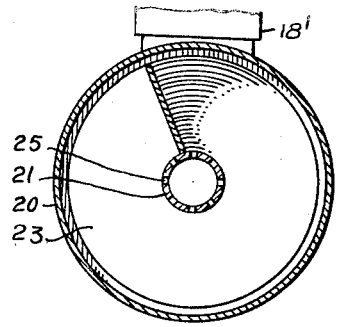
Figure 4:
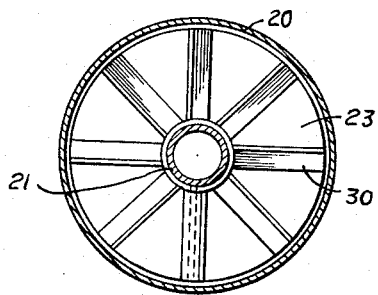

The chute 18' opens into one end of the housing 20, the opposite end of the housing being open and overlying a discharge bin 24. As shown in FIG. 3, the tubular shaft 21 is provided with a multiplicity of radial perforations 25, the end of the shaft 21 adjoining the outlet end of the housing 20 being plugged. The opposite end of the shaft 21 is open, extending from the housing 20 and overlying the open upper end of a discharge flume 26 which leads downwardly into a storage vessel 27 having a valved outlet conductor 28 at its lower end.

Thus, as the partially de-watered raw sewage passes through the press 19, it is squeezed or compressed and compacted by the revolving screw conveyor 23, quantities of water being extracted therefrom and removed through the perforations 25 for delivery through the tubular shaft 21 into the vessel 27.

Figure 5:
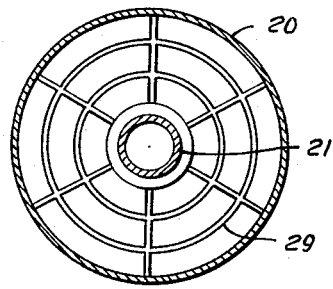

The housing 20 carries in its outlet end a plurality of fixed, circular, concentric knife blades 29, as shown in FIG. 5, through which the discharged solids from the raw sewage are forced and which cut and break up the solids into discrete particles. For further cutting and breaking up the solids, the shaft 21 carries immediately adjacent the knife blades 29 or in close proximity to the knife blades 29 a plurality of radial, angular knife or cutting blades 30 which revolve with the shaft 21 and, being in close proximity to the blades 29, cause a very effective chopping and cutting action to take place. In this manner, the semi-dried solids from the raw sewage are discharged as discrete particles into the bin 24 for further processing.

A vertical conveyor enclosure 31 extends upwardly from the bin 24, terminating at its upper end in a laterally directed branch 32 which opens downwardly and laterally into the upper end of a drying tower 33. A vertical bucket conveyor 34 is housed in the enclosure 31 and extends from the bottom portion of the bin 24 into adjacency with the lateral branch 32 for lifting and conveying the comminuted raw sewage solids from the bin 24 into the branch 32 and thence into the upper end of the drying tower 33.

For distributing the solids uniformly across the width of the drying tower, the branch 32 opens within the tower into a horizontal, perforated tube 35 extending transversely of the tower and enclosing a screw conveyor 36 revolved by a motor or other suitable driving means 37. Obviously, the screw conveyor functions to spread the solids uniformly through the length of the tube 35 so that they may pass downwardly therefrom through the perforations of the tube.

The drying tower is provided below the distributor tube 35 with a plurality of spaced, staggered, downwardly-inclined baffles 38 over which the comminuted solids are spread and cascaded for relatively complete drying. A plurality of heating tubes 39 are positioned beneath the baffles 38, the tubes 39 being connected in series and receiving a fluid heating media for drying the solids, as will be more fully explained.

The bottom wall 40 of the tower 33 is inclined and adjoins a lateral discharge passage 41 having therein a suitably driven blower 42 for blowing the dried solids upwardly through a conduit 43 into the apex of a Y-shaped distributor conduit having one branch 44 depending into the upper end of a first storage tank 45 and a second branch 46 depending into a second storage tank 47. A conventional flapper vane 48 determines into which storage tank the solids are directed.

The tanks 45 and 47 have discharge valves 49 and 50, respectively, at their lower ends which communicate with a feed pipe 51 depending into a solids burner tube 52. The feed pipe 51 may enclose suitable feed means such as a screw conveyor (not shown), and a blower 53 at the inlet end of the burner 52 supplies combustion air, and possibly some additional gaseous or vaporous fuel to the burner. In the heating of the solids in the drying tower 33, certain combustible vapors and gases will be evolved, and these are withdrawn from the upper end of the tower through a conduit 54 for suitable discharge as indicated at 55 or for conveyance to the blower 53 as additional fuel to that provided by the dried sewage solids. Further, additional supplementary fuel, such as natural gas, may be supplied to the blower 53 and burner 57 as indicated at 56.

The burner 52 opens into a combustion chamber 57 of generally rectangular configuration having an ash discharge outlet 58 at its end remote from the burner with a vertical transverse baffle 59 between the burner and the outlet for causing the burning or combusting solids to be blown upwardly and over the baffle so as to travel in a circuitous path.

The hot flue gases or vapors from the combustion chamber are withdrawn therefrom through a flue 60 and are passed in series fashion through the heating tubes 39 of the drying tower 33, being ultimately discharged at 61. If desired, and since most flue gases still retain some combustible materials, a portion of the flue gases may be diverted through a branch flue 62 and conducted to the blower 53 as supplemental fuel.

In the treatment of paunch manure, it is found that some fats and oils will be present, and it is desirable to separate these initially both to facilitate the subsequent treatment of the sewage material as well as to recover the fats and oils which may be further processed for the recovery of by-products having commercial value.

For this purpose, there is provided an initial fat separator tank 63 having at its upper end an inlet conductor 64 terminating within the tank 63 in a downwardly-facing diverter baffle 65 for diverting the incoming material downwardly into the interior of the tank 63. The tank 63 has a hopper bottom 66 opening through a double slide valve 67 into the inlet conduit 10. A plurality of screening plates or grids 68 open upwardly through one side wall of the tank 63 into a water outlet conductor 69 through which some water may be extracted from the sewage present in the tank 63.

A water operated jet apparatus is provided in the upper end of the tank 63 above the baffle 65 and includes a water inlet jet nozzle 70 opening into a deflector enclosure 71 provided with an air inlet conductor 72. This structure directs a high velocity jet of aerated water across the surface of the sewage in the tank 63 to aerate and float the fats and oils which may be present and to drive them across the tank 63 to an outlet conductor 73 positioned above the screens 68 and discharging into a stratification vessel 74 from which the fats and oils may be withdrawn through an upper outlet 75, and the stratified water withdrawn through a lower or bottom outlet 76.

The water discharge conductor 69 extends downwardly into the outlet conductor 18 of the vessel 17 and liquids from both may be discharged through a valved outlet conductor 77, and by means of a suitable pump 78, a portion of these liquids may be, and desirably are, driven upwardly through a conductor 79 to furnish a water supply for the jet nozzle 70.

The operation of the plant and the carrying out of the methods thereof is believed clear from the foregoing disclosure, but in brief, the paunch manure enters the vessel 63 and therein undergoes some degree of stratification and water separation, the fats and oils, together with some water, passing to the vessel 74 for stratification into fatty and aqueous layers. As previously noted, some portion of water is drawn off through the screens or grids 68, the remainder of the material, in more or less aqueous dispersion, passing downwardly to the inlet conductor 10 at a rate governed by the setting of the valve plates 67. The material is additionally de-watered in the screen assembly 12, compressed and further dried in the press 19, dried in the tower 33 and stored in the tanks 45 and 47 for regulated supply to the burner 52 and combustion chamber 57, in which the now relatively dry material is combusted and discharged as ash material.

In the event humus is to be treated rather than paunch manure, the vessel 67 is not utilized, but the raw sewage is instead admitted directly to the inlet conductor 10, the subsequent steps remaining as previously described.

Experimentation has shown that the dried solids from the sewage have a heating value of approximately 10,000 British Thermal Units per pound, and hence, one pound of this material would furnish sufficient heat to evaporate at atmospheric pressure approximately ten pounds of water. Thus, adequate heat is provided for final drying of the de-watered solids or sludge materials from the raw sewage, and there are possibilities of using the dried solids as a fuel.

It is contemplated that the dried solids, supplemented by the gases and vapors withdrawn from the upper end of the tower 33 through the conductor 54, will furnish the sole fuel required in the process, but this, of course, is subject to variation. If necessary or desirable, additional fuel of any nature can be supplied as needed or desired through the conductor 56 and/or the conductor 62.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. The method of sewage disposal including the steps of passing raw sewage into a rotary screening step and therein separating a portion of the liquids present in the sewage, withdrawing the separated liquids, passing the remaining raw sewage into a squeezing and compacting step to force out additional liquids and form a semi-dry sewage material, withdrawing the additional liquids, passing the semi-dry sewage material through a comminuting step in which the material is divided into discrete particles, conveying the discrete particles into a drying step and therein heating the particles to drive off sufficient moisture to form the particles into a relatively dry, loose and fluffy mass, combusting the latter mass to a fully-combusted, readily-disposable residue, and utilizing the hot combustion gases and vapors from the combustion step to heat the particles in the drying step.

2. The method of sewage disposal as set forth in claim 1 and passing the raw sewage through a grease and fat skimming step prior to the rotary screening step and therein skimming grease and fat from the raw sewage.

3. The method of sewage disposal as set forth in claim 2 and flowing at least a portion of the separated liquids from the rotary screening step onto the surface of the raw sewage in the grease and fat skimming step.

4. The method of sewage disposal as set forth in claim 1 and conducting gases evolved in the drying step to the combusting step to furnish additional fuel for the latter.

5. A sewage disposal plant including a rotary screen having an approximately horizontal axis, means for revolving the screen, means for admitting raw sewage to the interior of the rotary screen, a vessel for receiving from the exterior of the rotary screen liquids flowing therethrough from the raw sewage, an approximately horizontal de-watering drum having an open end and a closed end, means for passing the remaining raw sewage from the rotary screen into the closed end of the de-watering drum, a screw conveyor rotatably mounted in the de-watering drum for compressing and compacting the remaining raw sewage and expressing liquids therefrom to form semi-dry sewage, a rotatable tubular shaft in the de-watering drum carrying the screw conveyor, openings in the wall of the tubular shaft through which additional liquids expressed from the remaining raw sewage may pass, means for receiving from the tubular shaft such additional liquids, means for revolving the tubular shaft and screw conveyor, a knife assembly at the open end of the de-watering drum through which the semi-dry sewage is forced by the screw conveyor to comminute said sewage, a hopper for receiving the comminuted sewage, a drying tower, a lift conveyor leading from the hopper to the top of the drying tower, means for heating the sewage in the tower, an accumulation enclosure, means for conveying the dried sewage from the drying tower to the accumulation enclosure, a combustion enclosure, a dried sewage burner opening into the combustion enclosure, means for passing the dried sewage from the accumulation enclosure to the burner for burning in the combustion enclosure, and means for discharging from the combustion enclosure the residue from the burned dry sewage.

6. A sewage disposal plant as set forth in claim 5 wherein the rotary screen includes a pair of concentric screen cylinders, and a mass of inorganic filter material loosely confined therebetween.

7. A sewage disposal plant as set forth in claim 5 and a grease and fat skimming vessel through which the raw sewage flows before admission to the rotary screen for skimming grease and fat from said raw sewage.

8. A sewage disposal plant as set forth in claim 5 wherein the knife assembly includes a set of angularly disposed radial knives carried by the tubular shaft, and an adjoining set of concentric knives disposed at the open end of the de-watering drum.

9. A sewage disposal plant as set forth in claim 5 wherein the means for heating the sewage in the drying tower includes a plurality of vertically spaced inclined baffles in the tower over which the sewage passes, a plurality of heat exchange tubes in the drying tower underlying the baffles, and means for passing hot combustion gases from the combustion chamber through the heat exchange tubes.

10. A sewage disposal plant as set forth in claim 5 and sewage distributor means in the upper end of the drying tower including a perforated tube extending transversely of the upper end of the tower, the lift conveyor opening into the perforated tube, a screw conveyor in the perforated tube, and means for driving the latter screw conveyor.

11. A sewage disposal plant as set forth in claim 5 and means for conveying gases and vapors evolved from the sewage in the drying tower to the burner.

12. A sewage disposal plant as set forth in claim 5 and means for conveying combustion gases from the combustion enclosure to the burner.

References Cited

UNITED STATES PATENTS

| | | |
|---|---|---|
| 425,603 | 4/1890 | Fleischman. |
| 980,463 | 1/1911 | Welcome _____ 110—8 X |
| 1,892,681 | 1/1933 | Rankin. |
| 2,151,079 | 3/1939 | Bowen _____ 110—8 |
| 3,159,353 | 12/1964 | Atwater _____ 110—8 |
| 3,287,819 | 11/1966 | Hazzard _____ 110—8 |

JAMES W. WESTHAVER, *Primary Examiner.*